Feb. 13, 1940.   J. C. SEYLLER   2,190,164
LOADER
Filed March 3, 1939   4 Sheets-Sheet 1
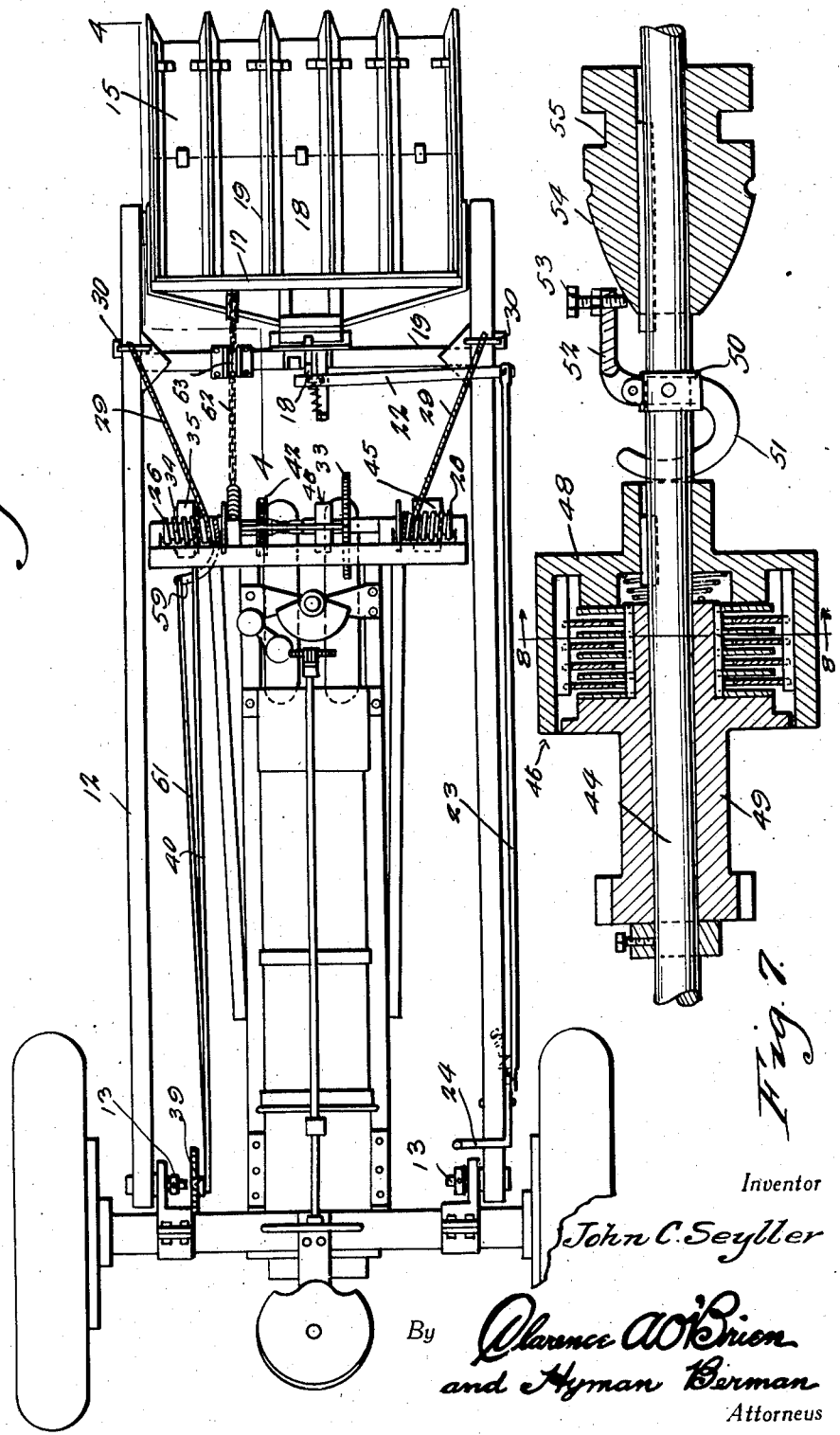
Inventor
John C. Seyller
By Clarence A. O'Brien
and Hyman Berman
Attorneys

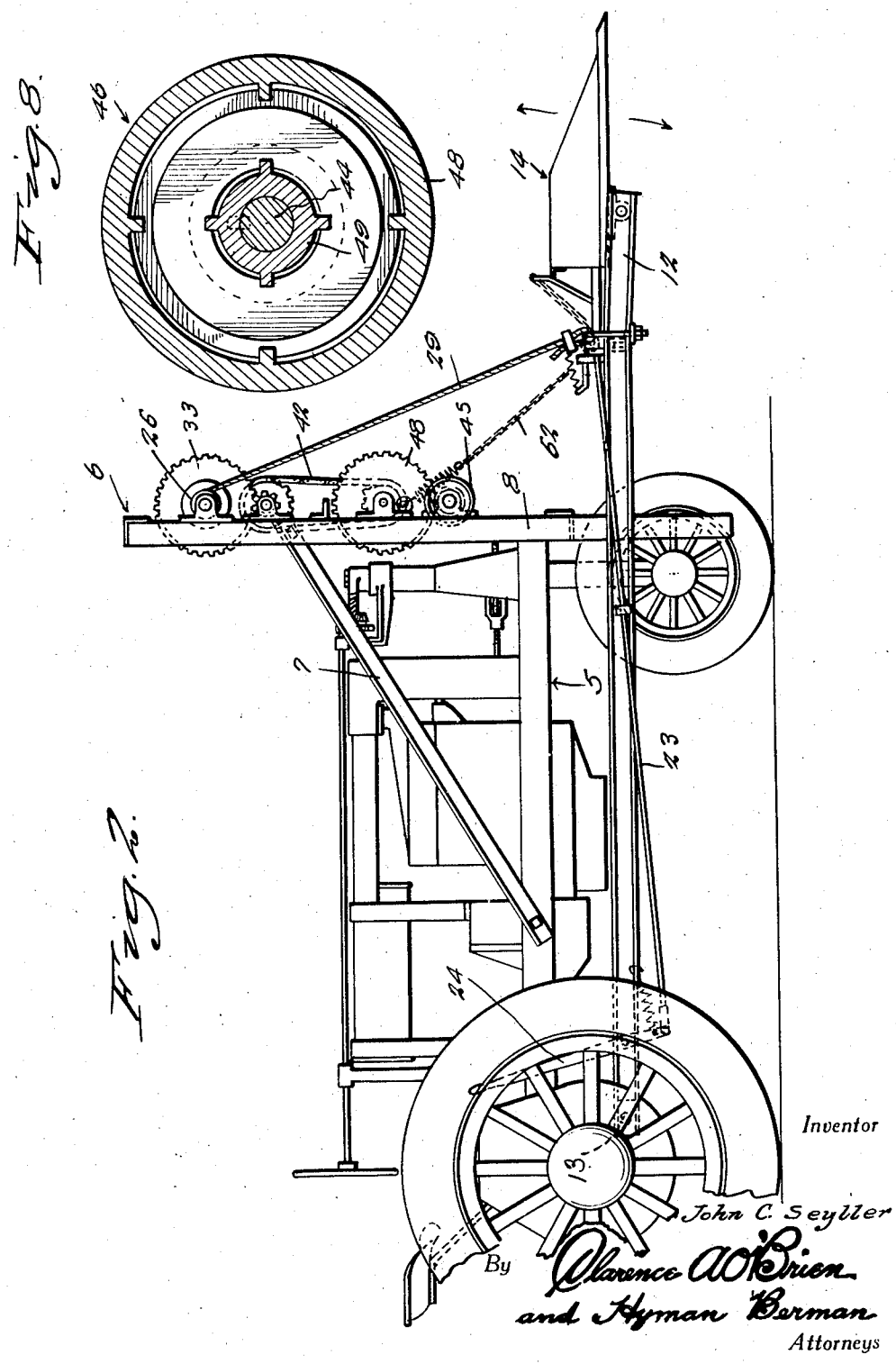

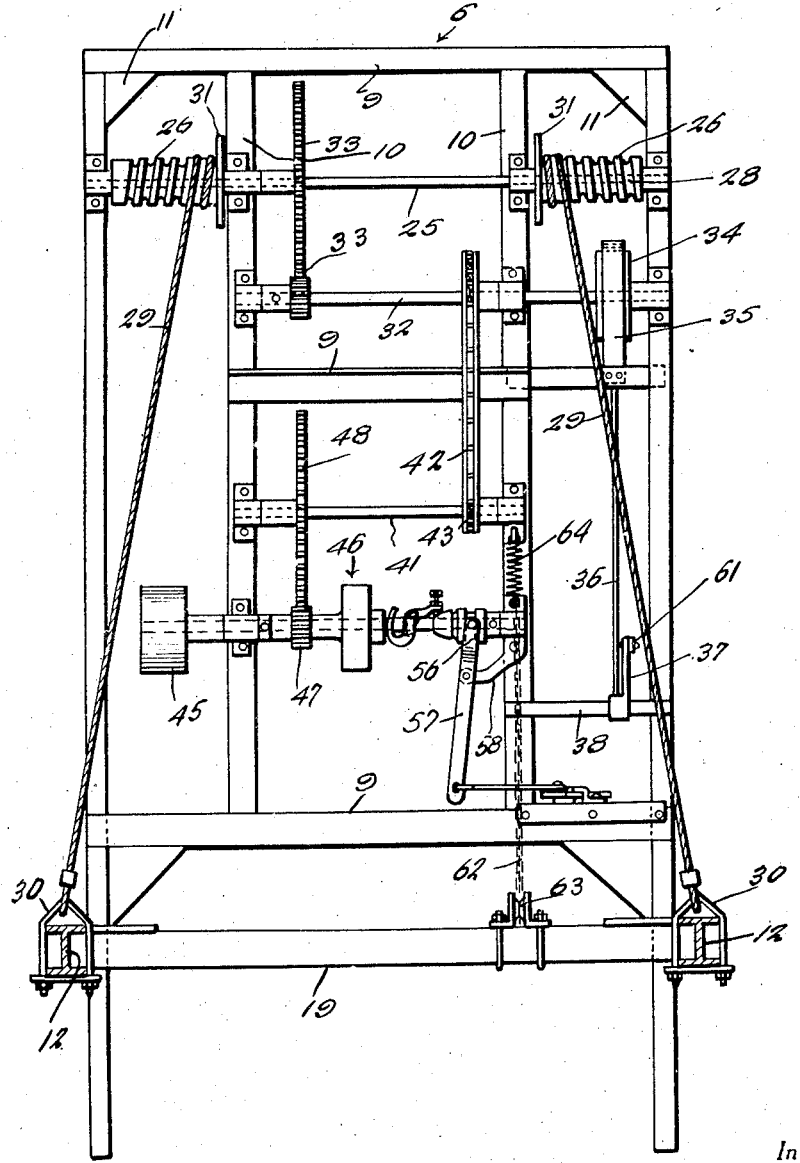

Feb. 13, 1940.   J. C. SEYLLER   2,190,164
LOADER
Filed March 3, 1939   4 Sheets-Sheet 4
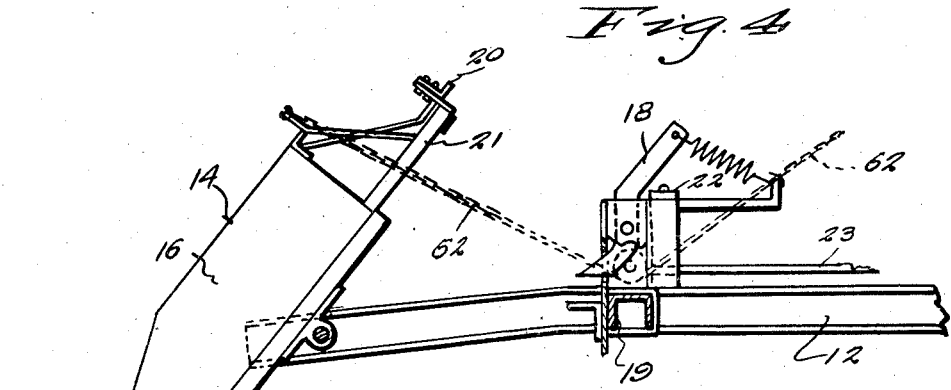
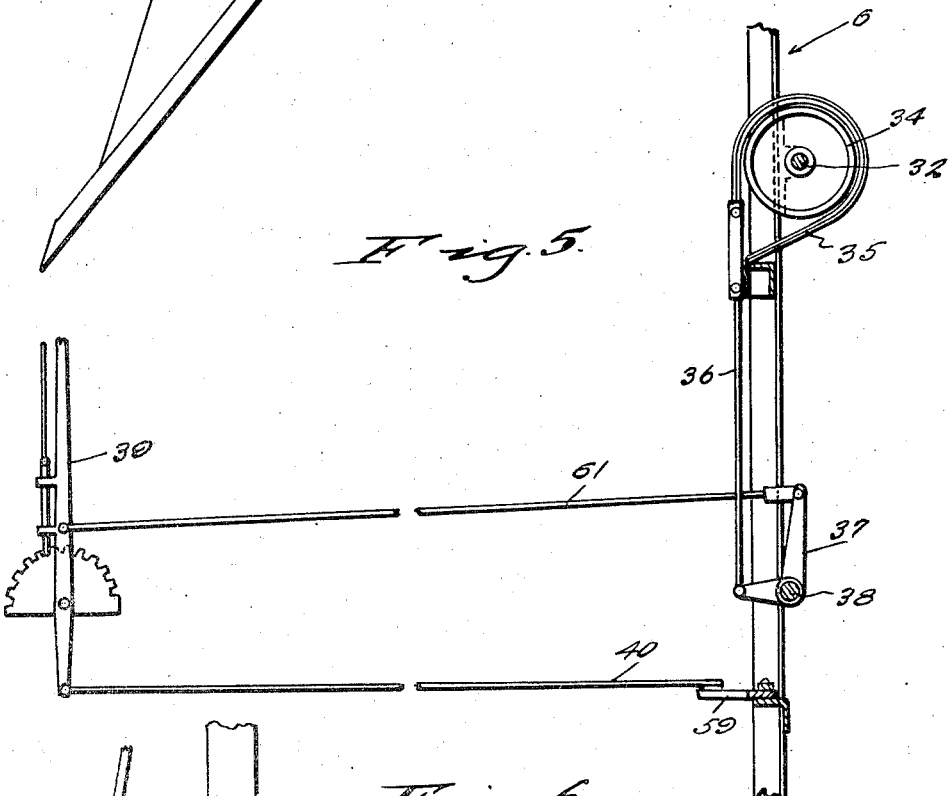
Inventor
John C. Seyller
By Clarence A. O'Brien
and Hyman Berman
Attorneys Patented Feb. 13, 1940

2,190,164

UNITED STATES PATENT OFFICE 2,190,164

LOADER

John C. Seyller, Prophetstown, Ill.

Application March 3, 1939, Serial No. 259,662

1 Claim. (Cl. 214—140)

This invention relates to loaders capable of handling various kinds of materials to gather said materials and place them onto a conveyance or to place said materials at a selected locality within a pile and has for the primary object the provision of a device of this character which may be readily installed on a conventional type of tractor and receive power therefrom for its operation, being under direct manual control of the driver of said tractor.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary top plan view illustrating a loader adapted to a conventional type of tractor and constructed in accordance with the present invention.

Figure 2 is a fragmentary side elevation illustrating the same.

Figure 3 is a transverse sectional view illustrating the hoisting mechanism.

Figure 4 is a fragmentary sectional view taken on the line 4—4 of Figure 1.

Figure 5 is a fragmentary side elevation, partly in section, illustrating a combined clutch and brake control.

Figure 6 is a fragmentary plan view illustrating a curved arm used in the clutch control.

Figure 7 is a fragmentary longitudinal sectional view illustrating a clutch.

Figure 8 is a sectional view taken on the line 8—8 of Figure 7.

Referring in detail to the drawings, the numeral 5 indicates a conventional type of tractor on which the present invention is mounted. Arranged at the front end of the tractor is a vertically disposed hoist frame 6 bolted or otherwise secured on the forward end of the frame and arranged so as to straddle the front wheels of the tractor. The frame 6 is further secured to the tractor by braces 7. The frame 6 includes vertically arranged side members 8 and a plurality of horizontally arranged cross members 9 and is further provided with vertically arranged members 10 arranged inwardly of the vertical members 8 and secured to the horizontally arranged members 9. The various members are suitably joined with each other and reinforced by braces 11.

Scoop carrying levers 12 are pivoted on the rear axle housing of the tractor, as shown at 13, and extend forwardly and terminate at a selected distance beyond the forward end of the tractor as well as the hoist frame 6. The levers 12 are arranged on opposite sides of the tractor and have pivotally mounted thereon a scoop 14 which may be readily converted into a loading fork by removing a section 15 of the bottom of the scoop. The scoop includes side walls 16, a rear wall 17 and a bottom wall 18. Reinforcing members 19 are secured on the bottom wall of the scoop and extend beyond the forward edge thereof to form penetrating points and are detachably connected to the removable section 15 of the bottom wall of the scoop so that said reinforcing members then will act as the tines of the fork. The scoop is pivoted off-center so that it will naturally move into an inclined position as shown in Figure 4. To support the scoop horizontally or in a plane substantially with the plane of the levers 12, a spring influenced catch 18' is provided on a cross member 19' connecting the levers 12 forwardly of the front end of the tractor. The catch 18' coacts with a keeper 20 carried by a frame structure 21 on the rear wall of the scoop to releasably secure the scoop in a plane substantially with the plane of the levers. To release the catch 18' from the keeper an arm 22 is pivotally mounted on one of the levers 19 and engages the catch and is connected to a link 23. The link 23 is pivotally connected to a control pedal 24 pivotally mounted on one of the levers 12 and is located adjacent to the operator's seat on the tractor so that the operator may at any time desired release the catch from the keeper 20 and free the scoop to assume a dumping position, as shown in Figure 4, by placing pressure on the pedal 24 with a foot.

Journaled on the upper portion of the frame 6 and arranged horizontally is a drum shaft 25 and secured on said shaft are drums 26 having grooves 28 to receive hoisting cables 29. The cables 29 wind in the grooves of the drums by the rotation of the shaft 25. The cables are connected to coupling elements 30 which join said cables with the elevating levers 12. Each drum is provided at one end with a flange 31 to prevent the cable of said drum from creeping off of the drum during the rotation of the shaft.

A brake shaft 32 parallels the drum shaft 25 and is journaled on the frame 6 in a plane below the drum shaft and is connected to said drum shaft by gears 33. A brake drum 34 is secured on the brake shaft 32 and is engaged by a brake band 35, one end of which is secured on one of the cross members 9 of the frame 6 while the other end is connected to an operating rod 36 which is in turn pivotally connected to a bell crank lever 37 journaled on a shaft 38 carried by the frame 6. The bell crank lever 37 is connected to a control lever 39 by a connecting rod 61. The control lever is mounted on the tractor adjacent the operator's seat and includes a toothed quadrant and a detent for locking the controlling lever in various positions.

A driven shaft 41 is journaled on the vertical members 10 of the frame 6 in a plane below the brake shaft 32 and is connected thereto by an endless sprocket chain 42 trained over sprocket gears 43 secured on the shafts 41 and 32.

Journaled on the vertical members 10 of the frame 6 in a plane below the driven shaft 41 is a power shaft 44 equipped with a pulley 45 employed for belting the power shaft to a power takeoff of the tractor.

A clutch 46 is associated with the power shaft and includes a gear 47 meshing with a gear 48 secured on the driven shaft 41. The clutch 46 is of the multiple disc type, as shown in Figure 7, and includes a housing consisting of sections 48 and 49. The section 49 has the gear 47 formed thereon while the section 48 receives the section 49 therein and is keyed on the power shaft 44 while the section 49 is rotatably supported by the power shaft. Certain of the discs or plates of the clutch are keyed to the section 48 while other of the plates are keyed to the section 49 and when said sections are moved toward each other brings about binding of the plates thereby establishing a drive from the power shaft to the driven shaft.

A boxing 50 is secured on the drive shaft 44 and has pivotally mounted thereon a clutch operating arm 51 which engages the section 48 of the clutch and includes an extension 52 having a set screw 53 adapted to ride a cone-shaped cam 54 splined on the drive shaft and is provided with a groove 55 to receive a fork 56 forming a part of a clutch operating lever 57 pivotally mounted on a bracket 58 carried by the frame 10. The clutch lever when moved in one direction will engage the clutch and when moved in an opposite direction will permit the clutch to become disengaged, it being understood that the clutch plates carried by the sections 48 and 49 move apart at this time so that the drive between the drive shaft 44 and the driven shaft 41 will be interrupted. A curved lever 59 is connected to the clutch lever 57 by a link 60 and the curved lever 59 is connected to the control lever 39 by a connecting rod 40. Thus it will be seen that when the clutch is operated the brake also will be operated. In other words, when the clutch is disengaged to interrupt the drive between the power shaft and the driven shaft, the brake will be applied to hold the drums against rotation of the load of the scoop, consequently permitting the scoop to maintain any position of elevation with respect to the ground when power is interrupted to the driven shaft.

It is to be understood that the clutch becomes disengaged just prior to the application of the brake so that if it is desired to lower the scoop it can be prior to the application of the brake depending on the position occupied by the control lever 39.

A flexible element 62 is connected to the frame 21 of the scoop and passes over a pulley 63 on the frame 19 and is connected to a coil spring 64. The coil spring 64 is in turn connected to one of the members 10 of the frame 6. The purpose of the flexible element is to move the scoop out of dumping position after a predetermined downward movement of the levers 12 so that the scoop will be in operative position and the catch 18 in engagement with the keeper 20 when the scoop comes in contact with the ground.

From the foregoing description, taken in connection with the drawings, it will be seen that the operator of the tractor from a seated position will have full control over the operation of the scoop. At the will of the operator the scoop may be lowered into engagement with the ground for the purpose of gathering or taking up material. The operator then through the manipulation of the lever 39 may bring about elevation of the scoop to a desired distance from the ground whence the tractor may carry the material in the scoop to any place desired or for dumping onto a conveyance. To dump the scoop the operator presses the pedal 24 which disengages the catch 18' from the keeper and the scoop automatically assumes dumping position due to the fact that it is pivoted off-center. As soon as the scoop is moved a predetermined distance toward the ground the flexible element 62 acts on the scoop to position the latter in operative position with the keeper in engagement with the catch 18.

When it is desired to convert the scoop into a fork, the section 15 of the bottom wall of the scoop is removed and the reinforcing members 19 then act as tines whereby hay, straw and other material may be readily gathered and conveyed to a selected place by the device.

It is believed that the foregoing description, when taken in connection with the accompanying drawings, will fully set forth the construction and advantages of this invention to those skilled in the art to which such invention relates, so that further detailed description will not be required.

What I claim is:

A loader for use on a tractor having a rear axle housing and a chassis comprising a pair of scoop elevating bars pivoted at rear ends thereof on said axle housing for vertical swinging movement in unison upon opposite sides of said chassis and extending forwardly of the latter, a scoop mounted on said bars between the front ends thereof for elevation thereby, a frame adapted to be secured to the front end of the chassis in upstanding position and extending transversely of the chassis intermediate said bars, a transversely extending hoisting drum shaft on said frame adjacent the top thereof, a pair of drums on opposite ends of said shaft, cables operatively connecting said drums to said bars, respectively, a transversely extending brake shaft on said frame below said drum shaft and geared to said drum shaft, a driven shaft on said frame below said brake shaft, a sprocket and chain drive between said driven and brake shafts, a power shaft on said frame below said driven shaft for connection to a source of power, a clutch on said power shaft having a driven member geared to said driven shaft and a shiftable driving member, a brake drum on the brake shaft, a brake band for applying friction to the brake drum, and a control lever adjacent the rear end of said bars, operatively connected to said band and to the shiftable driving member to alternately shift said member and engage said band with said brake drum, said shafts being arranged in a common vertical plane on said frame to economize in lateral space.

JOHN C. SEYLLER.